United States Patent [19]

Hedlund

[11] 4,114,304
[45] Sep. 19, 1978

[54] DEVICE FOR PREVENTING ICE FISHING HOLES FROM FREEZING CLOSED

[76] Inventor: Richard C. Hedlund, 142-17th Ave., NE., (Apt. 4), Minneapolis, Minn. 55413

[21] Appl. No.: 762,976

[22] Filed: Jan. 27, 1977

[51] Int. Cl.² .............................................. A01K 97/00
[52] U.S. Cl. ...................................... 43/4; 126/360 A
[58] Field of Search .................. 43/4; 126/360 R, 367, 126/271.2

[56] References Cited

U.S. PATENT DOCUMENTS

| | | | |
|---|---|---|---|
| 2,541,328 | 2/1951 | Boklep | 126/360 R |
| 2,747,569 | 5/1956 | Holm et al. | 126/367 |
| 3,056,272 | 10/1962 | Eilers | 43/4 X |
| 3,128,758 | 4/1964 | Schwabe | 126/360 R |
| 3,204,630 | 9/1965 | Rydeen | 126/360 R |

*Primary Examiner*—Russell R. Kinsey
*Assistant Examiner*—Daniel J. Leach
*Attorney, Agent, or Firm*—Peterson, Palmatier, Sturm & Sjoquist, Ltd.

[57] ABSTRACT

A tapered tubular casing of sheet metal has an open upper end and a closed bottom end. Sheet metal connectors having upwardly and downwardly directed tangs are spot welded to diametrically opposite portions of the casing adjacent the upper end thereof. The upper ends of two flexible chains are attached to holes in the lower tangs. One chain is somewhat shorter than the other, the shorter chain having an open hook attached to its free end and the longer chain having a snap hook attached to its free end. When the device is in use to keep an ice fishing hole from refreezing, the open hook is releasably fastened to an eye screw anchored in the floor of a fish house and the snap hook is similarly releasably fastened to a second eye screw. When the open hook is disengaged from its eye screw and combustible material, such as balled newspaper or charcoal lighter fluid, is placed in the device and ignited, the heat causes the casing to free itself and pop up from the surrounding ice, the snap hook on the longer chain restraining the device from popping completely out of the water. When the ice fisherman leaves his fish house for any length of time, he re-engages the hooks with the eye screws. In this way, he need only repeat the igniting of the combustible material when he again wishes to fish, there being no need to chop or auger a new hole.

7 Claims, 5 Drawing Figures

U.S. Patent  Sept. 19, 1978  4,114,304
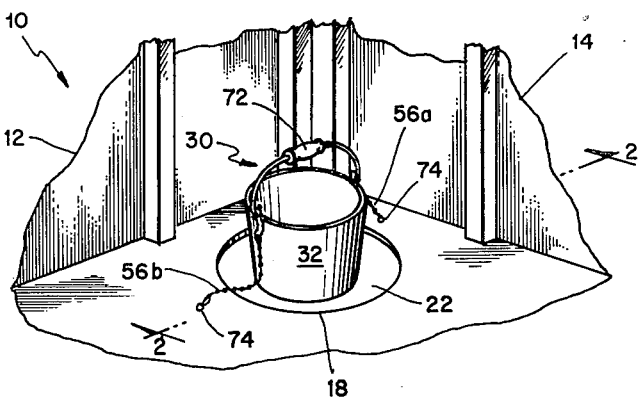
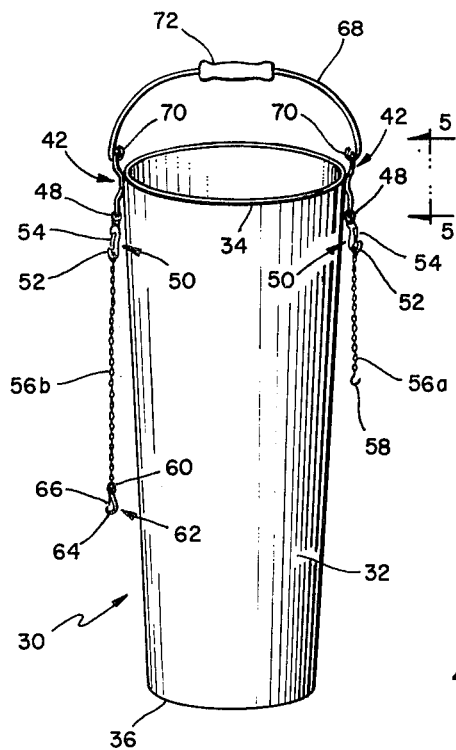
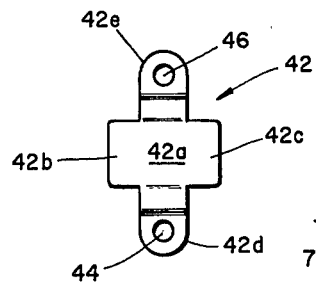
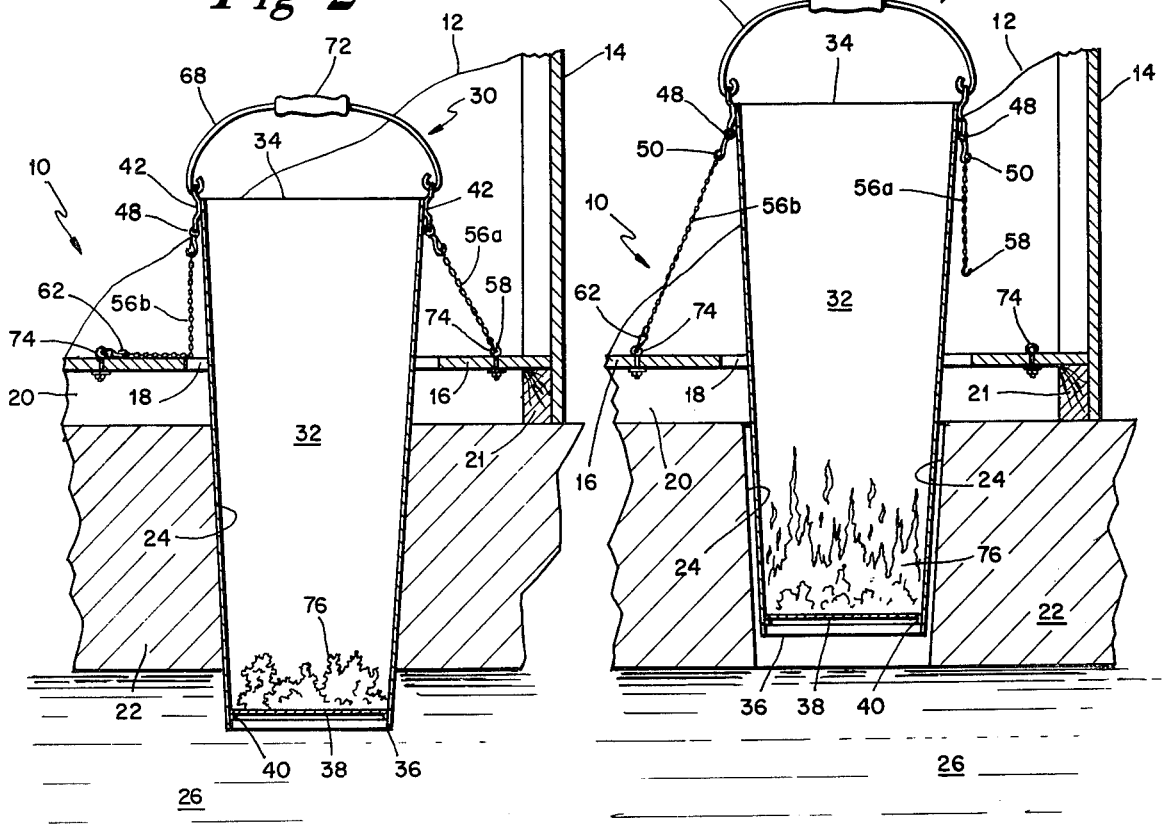

DEVICE FOR PREVENTING ICE FISHING HOLES FROM FREEZING CLOSED

BACKGROUND OF THE INVENTION

1. Field of the Invention

This invention relates generally to ice fishing, and pertains more particularly to a device that will keep an ice fishing hole from freezing closed.

2. Description of the Prior Art

While a number of contrivances have been devised for keeping an ice fishing hole open while in use, to my knowledge nothing has been available for preventing an ice fishing hole from freezing over during the relatively long periods when the ice fisherman is away. Because of this, a new fishing hole must be either chopped or augered when the ice fisherman returns to his fish house.

Reopening the ice hole, either by chiseling or boring, is indeed a fatiguing chore. When ice thicknesses on the order of 30 inches or so are encountered, such thicknesses being quite common in northern climes, the task becomes particularly time-consuming and demoralizing when the fisherman is anxious to drop in his line as soon as possible. Just the time can be extremely annoying. However, the exertion can be so severe in reopening an ice fishing hole that some fishermen actually, owing to the desire to fish as quickly as possible, overtax their vascular systems and subject themselves to an increased likelihood of heart attacks.

SUMMARY OF THE INVENTION

Accordingly, a primary object of the present invention is to prevent an ice fishing hole from refreezing once it has been formed. More specifically, it is an aim of the invention to provide a device having a tapered sheet metal casing with a closed bottom so that the ice reforms around the casing, yet when a combustible material is ignited within the casing the reactive forces resulting from the developed heat are such as to cause the device to pop up, leaving a hole in the ice having the same dimensions as that portion of the casing around which the ice has reformed.

Another object is to provide a device that will assure an ice hole having smooth sides, even though the ice shole may have originally been chiseled with irregular or jagged surfaces. The avoidance of rough edges makes it much easier to lower and raise a fishline, particularly when pulling in a fish that has been caught.

Another object of the invention is to provide a device of the foregoing character with a conveniently manipulated hold-down feature. In this regard, it is within the purview of the invention to provide two chains, one chain being shorter than the other so that when the shorter chain is released, and the casing heated, the longer chain will prevent undue jumping up or popping up of the device.

Yet another object of the invention is to provide a device that is extremely simple and inexpensive to fabricate, thereby encouraging its widespread use by ice fishermen.

Still another object of the invention is to provide a device that will be very easy to use, both to install when leaving a fish house and to remove upon returning. More specifically, the fisherman need only engage two hooks just prior to his departure and, as explained above, toss in a small amount of combustible material when he comes back, the lighting of the material freeing the device to reopen the hole.

Also, the invention has for an object the provision of a device that is very lightweight, thereby permitting it to be readily transported to the fish house at the beginning of the season and easily carried back at the end of the season. If the ice fisherman chooses to do so, he can carry some of his tackle in the casing. Also, the device is sufficiently compact so that it takes up very little space in the fisherman's automobile or when stored between seasons.

Briefly, my invention comprises a tubular sheet metal casing having an open upper end and a closed bottom end. The casing is sufficiently long and the taper sufficiently slight so that irrespective of the thickness of the ice, only a small amount of heat is required to provide sufficient thermal expansion so that the tapered side wall of the device reacts against the ice around the side wall so that the device readily pops up. A somewhat shorter chain is anchored at its upper end adjacent the upper end of the casing and has an open hook at its lower end which is easily engaged with an eye screw anchored to the fish house floor. A second chain, being somewhat longer than the first chain, is attached to a second eye screw by means of a snap hook. Consequently, when the tubular casing pops up, this being after the open hook as been disengaged from its eye screw and combustible material placed in the interior of the casing has been ignited, the second chain, owing to its length and the snap hook attached to its lower end, keeps the casing from jumping completely out of the water due to the buoyant action of the water beneath the ice.

BRIEF DESCRIPTION OF THE DRAWING

FIG. 1 is a fragmentary perspective view of one corner of a typical fish house showing my device in actual use;

FIG. 2 is a sectional view taken in the direction of line 2—2 of FIG. 1;

FIG. 3 is a sectional view corresponding to FIG. 2 but after combustible material has been placed in the tubular casing and ignited to free the device, the longer of the two chains restraining the device from popping completely out of the ice hole.

FIG. 4 is a perspective view of my device prior to being used, and

FIG. 5 is a detailed view of one of the two diametrically located connector pads, the view being in the direction of line 5—5 of FIG. 4 but with the hold-down chain at this side removed so as to expose to view the connector pad at this side.

DESCRIPTION OF THE PREFERRED EMBODIMENT

In order to appreciate the benefits to be derived from a practicing of my invention, a corner of a typical fish house 10 has been shown in FIG. 1. Conventionally, fish houses of this character have four walls; however, portions of just two walls 12 and 14 have been pictured. However, a floor 16, usually of plywood, has a hole 18 cut therein for the accommodation of a fishline. Underlying the edges of the floor 16 are floor supports 20, 21. Sometimes, fish houses rest directly on the surface of the ice, although the late winter removal of the fish house from the lake or river can be made more difficult due to the freezing of the underside of the floor to the ice. My device 30 can be readily used in either situation.

The ice beneath the floor 16 has been denoted by the reference numeral 22. Although initially the hole cut by the fisherman through the ice 22, either by chopping or augering, will be larger than the hole 24, the hole 24 represents the size hole that will be kept open. The ice 22 overlies a body of water 26, which may be a lake or river.

My device has been designated generally by the reference numeral 30. It comprises a tapered tubular casing 32 of galvanized sheet metal. Owing to the taper imparted to the sides of the casing 32, it will be appreciated that the upper end 34 is somewhat larger than the lower end 36. The upper end 34 is open and the edge or rim thereof is preferably rolled inasmuch as it is planned that the casing be of only 20 gauge sheet metal. For drafting simplicity the rolled configuration has not been depicted, however. The smaller lower end 36 of the casing 32 is closed by means of a circular disc or plate 38 that is integrally secured to the lower end 36 of the tubular casing 32 by means of a seam weld 40.

My device 30 further includes a pair of 16 guage galvanized sheet metal pads 42, each having a flat body 42a with laterally extending tabs 42b, 42c and oppositely directed vertical tangs 42d, 42e. The downwardly directed tang 42d has a hole 44 therein, whereas the upwardly directed tang 42e has a hole 46 therein. Although rivets can be utilized, it is planned that the flat body 42a of each connector pad 42 be spot welded to the tapered casing 32 just below the upper end or rolled rim 34. The two connector pads 42 are diametrically located with respect to each other.

Engaged in each of the holes 44 in the two downwardly directed tangs 42d is a ring 48 located at one end of a snap hook denoted generally by the reference numeral 50 in each instance. Each snap hook 50 has a hook 52 at its other end closed by a locking spring 54 so as to hold captive the upper end of a pair of chains 56. One chain 56 is shorter than the other and has been distinguished by the suffix "a" and the longer one distinguished by the suffix "b". Connected to the lower or free end of the shorter chain 56a is an open hook 58. Attached to the lower or free end of the longer chain 56b by means of a ring 60 is a snap hook 62 having a hook 64 and a locking spring 66. The snap hooks 50 and 62 can be identical.

A wire handle 68 is pivotally attached to the upwardly directed tangs 42e by means of reversely turned or loop ends 70, the ends 70 passing through the holes 46 in the tangs 42e. A tubular carrying grip 72 encircles a portion of the handle 68.

The casing 32 has a length of 42 inches. Its open or upper end 34 has a diameter of 7 inches, whereas its lower or closed end 36 has a diameter of 6.5 inches, thereby providing an optimum taper of 6% at each side of the casing 32.

While the foregoing completes the description of my device 30, the device 30 is used in conjunction with accessories in the form of two eye screws 74. The eye screws 74 are anchored to the wooden floor 16 near the hole 18 therein. By so doing, the casing 32 can be manually pushed downwardly through the floor hole 18, through the ice hole 24 and into the water 26. It will be understood that the hole 24 may have been initially cut with irregular and jagged edges, particularly if it is chiseled and not augered. However, once my device 30 has been in place for a sufficient period while the fisherman is away, the hole 24 conforms to the tapered casing 32 and is completely smooth, being devoid of sharp and jutting edges.

When the casing 32 is forced sufficiently downwardly so that the open hook 58 on the end of the shorter chain 56a can be engaged with one of the eye screws 74; the chain 56a, even though the water 26 tends to buoy the casing 32 upwardly, nonetheless holds the device 30 in place. It is then that the snap hook 62 is engaged with the other eye screw 74. Owing to the longer length of the chain 56b, the chain 56b, quite obviously, remains slack during the holding down of the device 30 by virtue of the chain 56a.

After having anchored the device 30 in the manner described above, the fisherman can leave the fish house 10 for prolonged periods of time. Whenever he returns, all that he need do is toss into the interior of the tubular casing 32 a small quantity of combustible material, such as the newspaper balls 76 in FIG. 2. However, it should be appreciated that a small quantity of charcoal lighter fluid will suffice to produce the requisite heat and the concomitant thermal expansion of the tubular casing 32 when ignited.

Whereas FIG. 2 depicts the device 30 in the process of preventing the hole 24 from refreezing, FIG. 3 depicts my device 30 after the combustible material 76 has been ignited. It will be understood that the heat produced from the ignited material 76 causes the sheet metal casing 32 to expand. Because of the tapered sides, any outward expansion produces an upwardly directed force component that causes the casing 32 to move rapidly upwardly and out of the hole 24 as illustrated in FIG. 3. Of course, before the material 76 is ignited, the fisherman will have disengaged the open hook 58 from its eye screw 74. However, he does not disengage the snap hook 62 from its eye screw. Consequently, the chain 56b functions as a safety device as far as preventing undue upward travel of the casing 32. In other words, the casing 32 can only jump or pop upwardly until the chain 56b becomes taut.

It is after the chain 56b has become taut that the snap hook 62 will be disengaged or unlatched from its eye screw 74 and the entire device 30 removed from the holes 18 and 24.

By reason of my tapered casing 32, the resulting ice hole 24 has a similarly configured smooth surface. Consequently, there are no jagged ice edges jutting into the hole 24, such as when a hole is chopped or chiseled. Consequently, nothing can interfere with the free movement of the fishline and any fish that are caught. The most important feature or benefit to be derived from my invention, however, is the complete avoidance of any physical effort in reopening the hole 24 when the fisherman returns, irrespective of the period he is gone. He can always quickly open the hole 24 by tossing in the combustible material 76 then igniting it to cause the casing 32 to pop up as explained above.

I claim:

1. A device for preventing ice fishing holes from freezing closed comprising a tapered tubular casing of sheet metal having an open upper end enabling combustible materials to be introduced into the interior of said casing and having a slightly smaller lower end by reason of the taper imparted to said casing, a disc integrally secured to the smaller lower end of said casing to form a closed bottom for the casing, a flexible chain attached at one end to said casing adjacent the upper end thereof for maintaining said closed end submerged beneath the surface of a body of water and said open end above the surface of said body of water so that ice forming around the outer surface of said casing intermediate its upper and lower ends assumes the taper of said casing, and a fastening element carried at the other end of said chain, whereby the igniting of combustible material introduced into the interior of said tubular casing produces heat causing thermal expansion of said casing with the consequence that said tubular casing is urged upwardly.

2. A device in accordance with claim 1 in which said fastening element constitutes a hook.

3. A device in accordance with claim 2 including a second chain attached at one end to said casing adjacent its said upper end and spaced from the location where said first chain is attached, and a snap hook carried at the free end of said second chain.

4. A device in accordance with claim 3 in which said second chain is longer than said first chain.

5. A device in accordance with claim 4 including a pair of connector pads fixedly secured to diametrically opposite portions of said casing adjacent its said upper end, said first chain being attached at its said one end to one of said connector pads and said second chain being attached at its said one end to the other of said connector pads.

6. A device in accordance with claim 5 in which said connector pads each have a flat body secured to said casing and downwardly and upwardly directed tangs extending from said body, each tang having a hole therein, and a ring extending through each hole in each downwardly directed tang, and a snap hook connected to each ring, the said one end of said first and second chains being attached to said snap hooks.

7. A device in accordance with claim 6 including a wire handle having hook ends extending through the holes in said upwardly directed tangs.

* * * * *